March 8, 1966 M. RIGERT 3,239,617
SECTIONALIZING SWITCH
Filed Sept. 6, 1963 2 Sheets-Sheet 2
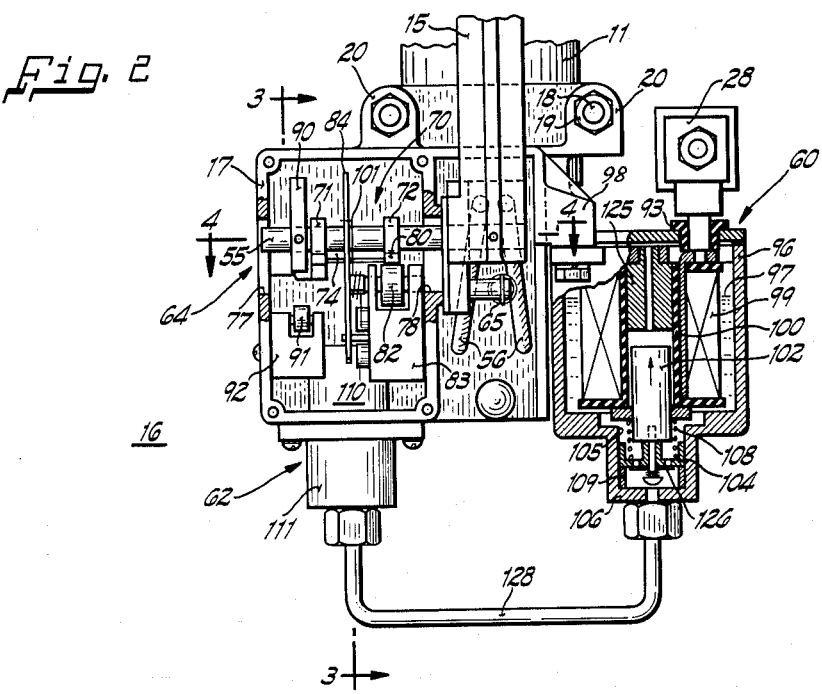
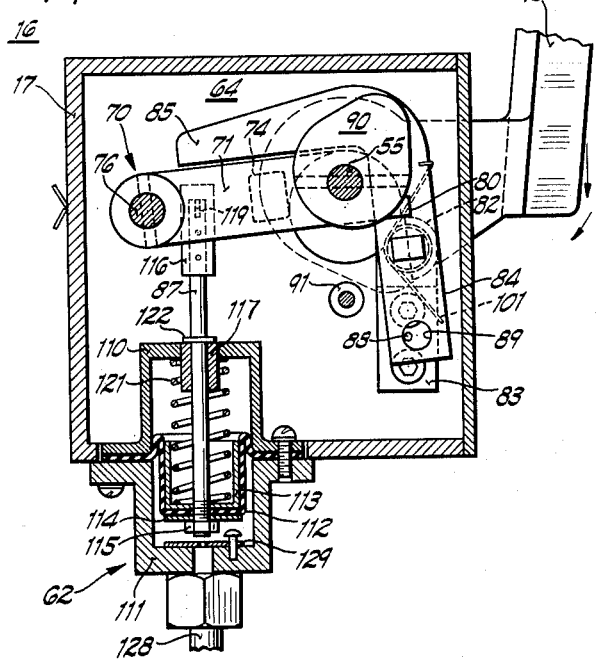
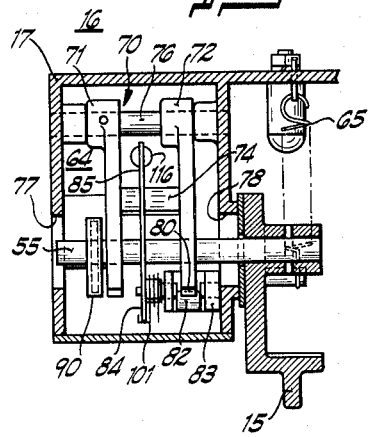
INVENTOR.
Max Rigert
BY Fred Wiviott
Attorney United States Patent Office 3,239,617
Patented Mar. 8, 1966.

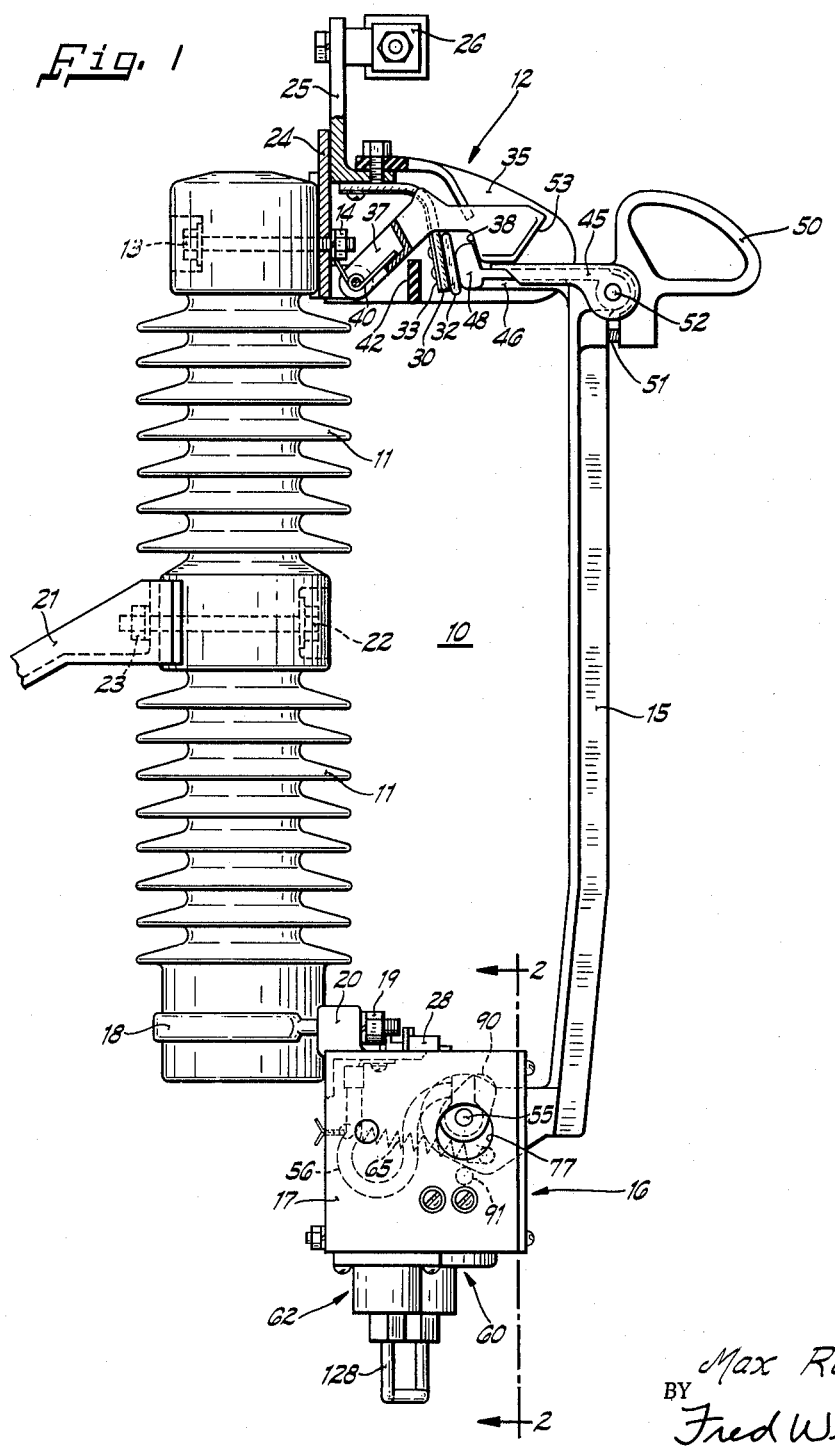

3,239,617
SECTIONALIZING SWITCH
Max Rigert, West Allis, Wis., assignor to McGraw-Edison Company, Milwaukee, Wis., a corporation of Delaware
Filed Sept. 6, 1963, Ser. No. 307,144
12 Claims. (Cl. 200—48)

This invention relates to switches and more particularly to sectionalizing switches for automatically sectionalizing or isolating faulted portions of a transmission system.

It is common practice in distribution systems to utilize a repeating circuit interrupter connected in series with the main distribution line and located adjacent the source of power and sectonalizer switches disposed in feeder lines radiating from the main line. Because the majority of faults in such systems are temporary in nature and will clear in a relatively short time, it is common to adjust the repeating circuit interrupter so that upon the occurrence of a fault it will execute a series of rapidly successive opening and reclosing operations, during which time the sectionalizer contacts remain closed to prevent unnecessary operation thereof. If the fault has not cleared after a predetermined number of such opening and reclosing operations, usually three, it is considered permanent, in which case it should be isolated from the source. If the fault is in one of the feeder lines, its sectionalizer switch will open subsequent to the third opening operation of the circuit interrupter, thereby isolating the fault in the feeder line. For this purpose sectionalizer switches are provided with fault integrating means which count the number of fault current impulses and then operate the sectionalizer switch opening means whereupon the faulted feeder line will be isolated from the main line while the circuit to the remaining feeder lines remain intact. This opening of the sectionalizer switch contacts takes place while the repeating circuit interrupter is open, so that the sectionalizer switch is not required to have interrupting capacity. After the sectionalizing switch in the faulted section has opened, the repeating circuit interrupter again recloses restoring service to the non-faulted feeder lines. If the permanent fault exists in the main line, however, the sectionalizing switches will remain inactive while the repeating circuit interrupter cycles to lockout, so that when service is restored in the main line, the feeder lines will be immediately energized.

It is an object of the invention to provide a simple and economical operating mechanism for a sectionalizing switch which incorporates a conventional air disconnect switch.

It is another object of the invention to provide an operating mechanism for a sectionalizing switch wherein a latching means holds a switch blade in engagement with stationary contact means and counting means is operable after a predetermined number of occurrences of an abnormal circuit condition to release the switch blade for pivotal movement out of engagement with the stationary contact means and cam means coupled to the switch blade resets the latch means during pivotal movement of the switch blade.

These and other objects and advantages of the instant invention will become more apparent from the detailed description thereof taken with the accompanying drawings in which:

FIG. 1 is a side elevational view, partly in section, of the sectionalizer switch according to the instant invention;
FIG. 2 is a view taken along lines 2—2 of FIG. 1;
FIG. 3 is a view taken along lines 3—3 of FIG. 2; and
FIG. 4 is a view taken along lines 4—4 of FIG. 2.

In general terms, the invention comprises a switching device having stationary contact means, switchblade means, first means spaced from the stationary contact means and having an initial position for supporting the switchblade means for pivotal movement toward engagement with the stationary contact means and having a second position wherein the switchblade means is free to pivot out of engagement with the stationary contact means. In addition, second means are provided for holding the first means in its initial position and electroresponsive means in circuit with the switchblade means is responsive to an abnormal circuit condition to render the second means inoperative to support the first means so that the switchblade is disengaged from the stationary contact means. Further, resilient means may be provided for rotating the switchblade means away from the stationary contact means after the disengagement thereof. Also, means may be coupled to the switchblade means and operable upon the pivotal movement of the switchblade away from its stationary contact means to move the first means to its initial position and into supporting relation with the second means so that the switchblade means will be engaged with the stationary contact means upon pivotal movement thereof toward the stationary contact means.

Referring now to the drawings in greater detail, FIG. 1 shows a sectionalizing switch 10 according to the instant invention to include an insulator 11 of any suitable material, such as porcelain, and an air disconnect stationary contact assembly 12 mounted adjacent the upper end of insulator 11 by a through bolt 13 and a nut 14. The switch 10 also includes an operating mechanism 16 which pivotally supports a switch blade 15 for movement of its upper end into and out of engagement with the stationary contact assembly 12. Operating mechanism 16 is supported in a housing 17 which is affixed adjacent the lower end of the insulator 11 by a U-bolt 18 whose ends are secured by nuts 19 in eyes 20 formed integrally on the upper end of housing 17. Sectionalizer 10 may be affixed to any suitable support structure by a bracket 21 which is affixed intermediate the ends of insulator 11 by a through bolt 22 and a nut 23.

Housing 17 also constitutes one terminal of the sectionalizer 10 and for this purpose is composed of a conductive material, such as copper.

Stationary contact assembly 12 is shown in FIG. 1 to include a base member 24 which is engaged by the bolt 13 and nut 14 and which supports a generally L-shaped terminal portion 25, one leg of which extends generally upwardly from the porcelain insulator 11 and carries a conductor clamp 26 and the other leg of which extends laterally of insulator 11 and carries a pair of stationary contact members 30. The members 30 are disposed in spaced apart side-by-side relation and each has a generally arcuate configuration with one of its ends affixed beneath the outwardly directed leg of the terminal portion 25 and its free end carrying a contact element 32. Configured similarly to the contact members 30 and affixed to the underside thereof are a pair of spring members 33 which provide contact pressure between the contact elements 32 and the switch blade 15.

An arc shield 35, composed of any suitable insulating material such as fiberglass reinforced resin, is affixed to the base member 24 and substantially surrounds the stationary contact members 30 and the contact elements 32.

An angular latch member 37 is pivotally mounted at one end on the base member 24 and extends through the gap separating the contact members 30. The opposite end of the latch member 37 carries a latch tip 38 for engagement with the switch blade 15. A sear spring 40 biases the latch member 7 towards clockwise rotation into enagement with the switch blade 15, or in the absence of said switch into engagement with a stop 42 integral with and extending inwardly from the sides of the arc shield 35.

The switch blade 15 is composed of any suitable conductive material, such as copper, and carries an integral contact member 46 and a release lever 45 at its upper end. The release lever 45 is pivotally mounted by a pin 52 for limited clockwise movement as viewed in FIG. 1. Contact member 46 extends laterally from switch blade 15 towards the stationary contact assembly 12 and carries an enlarged contact tip 48 at its outer end. The contact tip 48 is configured for engagement by the latch tip 38 so that when the switch blade 15 is in its closed position, contact tip 48 is held in engagement with the contact members 32 and the switch blade is prevented from rotating clockwise as seen in FIG. 1. A pull ring 50 is integral with release lever 45 whereby the latter can be pivoted clockwise against spring 51 to pivot latch member 37 through a slight counterclockwise angle so that member 48 can move out of engagement therewith upon clockwise pivotal movement of switch blade 15.

When the switch blade is rotated clockwise as viewed in FIG. 1, and the contact tip 48 moves clear of the latch member 37, spring 40 returns latch member 37 to its initial position. When the switch blade is subsequently pivoted towards its closed position, the contact tip 48 will engage the nose 53 of the latch 37 to force said latch to pivot through a small counterclockwise angle to allow the contact tip 48 to move into engagement with the contact members 32. Upon this event, the spring 40 rotates the latch member 37 clockwise until the latch tip 38 again engages the contact tip 48.

As will be described more fully hereinbelow, the lower end of the switch blade 15 is pivotally mounted on the operating mechanism 16 by a shaft 55 and is electrically connected to the housing 17 by a flexible conductor 56 so that when the switch blade 15 is in its closed position shown in FIG. 1, a current path exists between the conductor clamp 26 and the housing 17.

In general terms, the operating mechanism 16 is shown in FIGS. 2, 3 and 4 to include an electromagnetic pump assembly 60 which is operable upon each occurrence of a fault current in the system being protected to deliver a measured quantity of hydraulic fluid to a hydraulic integrating mechanism 62 which in turn is operable to elevate a stem 87 in a step-by-step manner. After a predetermined number of pumping operations the stem 87 will be elevated sufficiently to engage a trip member 84 and thereby to release a latch assembly 64 so that the switch blade 15 is freed for pivotal movement towards an open position under the influence of an opening spring 65 as will be described more fully hereinbelow.

Referring specifically to FIG. 2, the electromagnetic pump 60 is shown to include outer metallic shell 96 affixed to the housing 17 and made integral therewith by a clamp 98. The shell 96 is substantially filled with a hydraulic fluid 97, such as oil. A coil 99 is disposed within the shell 96 and is electrically connected in series with the switch blade 15 so that said coil will carry line current. As a result the current path through the sectionalizing switch 10 is from the upper conductor clamp 26, the terminal 25, the switch blade 15, conductor 56, housing 17, coil 99 and the lower conductor clamp 28 mounted atop the shell 96 and insulated therefrom by an insulating bushing 93.

Coil 99 is wound on a hollow non-conductive spool 100 which is suitably affixed within the shell 96 and which telescopically receives a magnetic plunger 102 for reciprocal movement therein. A pump piston 104 is affixed to the plunger 102 and is reciprocally movable in a cylinder 105 formed in a well portion 106 which depends integrally from the lower end of the shell 96. A spring 108 surrounds the lower end of the plunger 102 and urges said plunger and the piston 104 against a stop ring 109 disposed in the lower end of the cylinder 105.

The integrating assembly 62 includes an outer sealed housing consisting of upper and lower cup-shaped members 110 and 111, respectively, which are affixed to the housing 17 and suitably joined at their margins to clamp the periphery of a diaphragm 112. The upper surface of diaphragm 112 is engaged by a cup-shaped member 113 and its lower surface by a plate 114 which is secured between diaphragm 112 and the lower end of the stem 87 by a nut 115 which threadably engages the lower end of said stem. Stem 87 extends upwardly through the plate 114, the diaphragm 112, member 110 and through an integral bushing 117 in the upper end of housing member 110 where its upper end has a transverse aperture for receiving a cotter pin 119. A cap 116 is carried at the upper end of stem 87 and has three equally spaced apart apertures for receiving cotter pin 119 therethrough so that the proximity of the upper end of the cap 116 of the trip member 84 may be adjusted whereby the number of pumping operations required to cause tripping can be adjusted. A spring 121, extending between the inner surface of the cup-shaped member 113 and the housing member 110, urges the diaphragm 112 and the stem 87 downwardly toward the lower end of the housing member 111. The engagement between a ring member 122 affixed to the stem 87 and the upper housing member 110 limits the downward travel of said stem.

Each time a fault current impulse traverses the line being protected, the magnetic plunger 102 is drawn upwardly into the spool 100 until it impacts a metal plug 125. This draws the piston 104 a predetermined distance upwardly wherein the hydraulic fluid 97 is allowed to pass to the lower end of the well 106 through a plate check valve 126 carried by the lower end of the piston 105. When the backup recloser interrupts the line current, the plunger 102 and the piston 104 are released for movement downward in the well 106 by the spring 108. This forces a measured quantity of hydraulic fluid 97 through a conduit 128, underneath an orifice plate 129 and beneath the diaphragm 112 thereby forcing the latter a predetermined distance upwardly which in turn moves the cap 116 into closer proximity with the trip member 84.

If the fault clears before the number of operations of the pump 60 are sufficient to cause tripping, the spring 121 will force the diaphragm 112 downwardly as the hydraulic fluid 97 therebeneath is forced slowly past an orifice in the valve plate 129, through the conduit 128 and around the piston 104 so that after a predetermined interval the integrating mechanism 62 is in its initial position. If the fault does not clear upon the first or any subsequent operation of the recloser, the cap 116 on stem 87 will engage the trip member 84 after a predetermined number of operations and the switch blade 15 will open as described hereinbelow.

Referring now to FIGS. 2, 3 and 4, the latch assembly 64 is disposed in the metallic housing 17 and includes a generally H-shaped latch member 70 consisting of a pair of parallel spaced apart arms 71 and 72 and a central cross member 74 which interconnects the arms 71 and 72. As seen in FIG. 4, the arms 71 and 72 are each pivotally mounted at one end around a shaft member 76 extending between the side walls of the housing 17. The switch blade shaft 55 extends through enlarged apertures 77 and 78 in the side walls of the housing 17 and extends through and is rotatably mounted in the opposite ends of each of the arms 71 and 72 of the latch member 70.

The latch member 70 acting under the influence of gravity, tends to pivot clockwise around shaft 76, as viewed in FIG. 3, thereby moving the switch shaft 55 in a generally downward direction and away from the stationary contact assembly 12. This action is normally prevented by the engagement of a latch tip 80 carried at the free end of arm 72 and a half shaft latch 82 pivotally mounted on a support member 83 rigidly affixed to one side wall of housing 17. Rigidly affixed to the half shaft latch 82 and pivotal therewith is the trip member 84 which is generally L-shaped and has one arm 85 disposed in spaced relation above the upper end of the stem 87 of the integrator 62.

From the description thus far it will be evident that after predetermined number of pumping operations, the stem 87 of the hydraulic integrator 62 will advance sufficiently to engage the arm 85 of latch trip member 84 to rotate the latter clockwise, as viewed in FIG. 3, thereby rotating the half shaft latch 82 until the latch tip 80 carried on the arm 72 moves onto the flattened portion of said half shaft latch. This allows the latch member 70 to pivot through a slight clockwise angle thereby moving the switch shaft 55 downwardly.

Referring again to FIG. 1 it can be seen that downward movement of the switch blade shaft 55 will move the large contact portion 48 of contact member 46 downwardly and out of latching engagement with the face 38 of the latch 37 thereby freeing the switch blade 15 for clockwise rotation under the influence of opening spring 65.

Pivotal movement of the trip member 84 is limited by a pin 88 which extends through an aperture 89 in the lower end thereof. A spring 101 engaging the half shaft latch 82 acts to bias the latter toward counterclockwise rotation to a reset position after the stem 87 of the integrator 62 has resettled subsequent to the tripping operation just described.

In order to reset the latching assembly 64 after the tripping operation just described, the switch blade shaft 55 carries a cam member 90 adjacent its left end as viewed in FIG. 2 and horizontally above a roller 91 rotatably mounted in a frame portion 92 secured to a side wall of the housing 17. The enlarged portion of the cam 90 is oriented relative to the switch blade 15 in such a manner that as the switch blade moves toward its fully open position the cam 90 will engage the roller 91 and roll thereon until the enlarged portion moves into engagement therewith to elevate the switch blade shaft 55 and thereby rotate the latch member 70 counterclockwise as viewed in FIG. 3 until the latch tip 80 again engages the half shaft latch 82. Thus the latch assembly 64 is reset in preparation of a switch closing operation.

While only a single embodiment of the invention has been shown and described and while the invention has been illustrated with reference to one particular type of air disconnect switch, it is not intended that the invention be limited thereby but only by the scope of the appended claims.

I claim:

1. In a switching device, the combination of stationary contact means, switchblade means, first means spaced from said stationary means and having an initial position for supporting said switchblade means for pivotal movement into engagement with said stationary contact means and having a second position wherein said switchblade means is moved out of engagement with said stationary contact means, second means normally holding said first means in its initial position, electroresponsive means in circuit with said witchblade means and responsive to predetermined circuit conditions to render said second means inoperative to support said first means so that said switchblade means is disengaged from said stationary contact means, resilient means for rotating said switchblade means away from said stationary contact means after the disengagement thereof, and means coupled to said switchblade means and operative upon pivotal movement of said switchblade means away from said stationary contact means to more said first means to its initial position and into a supported relation relative to said second means so that said switchblade means will be engageable with said stationary contact means upon pivotal movement thereof toward said stationary contact means.

2. In a switching device the combination of stationary contact means, switch blade means, first spaced from said stationary contact means for supporting said switch blade means for pivotal movement into engagement with said stationary contact means, said first means being mounted for limited movement out of an initial elevated position wherein said switch blade means is disengaged from said stationary contact means, second means for holding said first means in said initial elevated position wherein said switch blade means is engageable with said stationary contact means upon said pivotal movement, electroresponsive means in circuit with said switch blade means and responsive to an abnormal circuit condition to move said second means out of engagement with said first means to free said first means for downward movement out of said initial elevated position so that said switch blade means is disengaged from said stationary contact means, means for rotating said switch blade means away from said stationary contact means after the disengagement thereof, means coupled to said switch blade means for raising said first means to its initial elevated position upon pivotal movement of said switch blade means away from said stationary contact means so that said switch blade means will be engageable with said stationary contact means upon pivotal movement thereof toward said stationary contact means.

3. In a switching device the combination of insulating means, stationary contact means disposed on an upper portion of said insulating means, switch blade means, first means disposed on said insulating means below said stationary contact means and supporting said switch blade means for pivotal movement into engagement with said stationary contact means, said stationary contact means including holding means for inhibiting pivotal movement of said switch blade means out of engagement therewith but being ineffective to prevent disengagement upon downward movement of said switch blade, said first means being mounted for limited downward movement out of an initial position wherein said switch blade means is moved downward out of engagement with said stationary contact means, second means for holding said first means in said initial position wherein said switch blade means is inhibited from pivotal movement, electroresponsive means in circuit with said switch blade means and responsive to an abnormal circuit condition to move said second means out of engagement with said first means to free said first means for movement out of said initial position so that said switch blade means is disengaged from said stationary contact means, resilient means for rotating said switch blade means away from said stationary contact means after the disengagement thereof, and cam means on said switch blade means for moving said first means to its initial position upon pivotal movement of said switch blade means away from said stationary contact means so that said switch blade means will be held in engagement with said stationary contact means upon pivotal movement thereof toward said stationary contact means.

4. In a switching device the combination of, stationary contact means, switch blade means, latch means pivotally supporting said switch blade means below said stationary contact means for pivotal movement into and out of engagement therewith, said latch means being gravity biased for limited downward movement so that said switch blade means is disengaged from said stationary contact means, catch means for holding said latch means in an elevated position wherein said switch blade means is engageable with said stationary contact means, electroresponsive counting means in circuit with said switch blade means and responsive to the appearance and disappearance of a predetermined number of abnormal circuit conditions to move said catch means out of engagement with said latch means to free said latch means for downward movement to disengage said switch blade means from said stationary contact means, spring means for rotating said switch blade means away from said stationary contact means after the disengagement thereof, and cam means coupled to said switch blade means for moving said latch means upwardly into engagement with said catch means upon pivotal movement of said switch blade means so that said switch blade means will be engageable with said stationary contact means upon pivotal movement thereof toward said stationary contact means.

5. In a sectionalizing switch the combination of insulating means, stationary contact means adjacent one end of said insulating means, switch blade means, shaft means affixed to said switch blade means, latch arm means pivotally mounted adjacent the other end of said insulating means and rotatably suporting said shaft means, catch means for holding said latch arm means in an unpivoted position wherein said switch blade means is in an engaged position relative to said stationary contact means, electroresponsive counting means in circuit with said switch blade means and responsive to the appearance and disappearance of a predetermined number of abnormal circuit conditions to move said catch means out of engagement with said latch arm means to free said latch arm means for movement out of its unpivoted position so that said shaft is moved relative to said stationary contact means to disengage said switch blade means from said stationary contact means, spring means for pivoting said switch blade means away from said engaged position after the disengagement thereof, and cam means on said shaft means for moving said latch arm means into engagement with said catch means upon pivotal movement of said switch blade means away from its engaged position so that said switch blade will be held in engagement with said stationary contact means upon pivotal movement thereof toward its engaged position.

6. In a switching device the combination of, nominally vertical insulating means, stationary contact means mounted on said insulating means, switch blade means, shaft means affixed to said switch blade means, latch arm means pivotally mounted on said insulating means in spaced relation below said stationary contact means and rotatably supporting said shaft means, said latch arm means being biased for pivotal movement away from said stationary contact means to disenageg said switch blade means from said stationary contact means, catch means for holding said latch arm means in an unpivoted position and said switch blade means in an engaged position relative to said stationary contact means, electroresponsive counting means in circuit with said switch blade means and responsive to the appearance and disappearance of a predetermined number of abnormal circuit conditions to move said catch means out of engagement with said latch arm means to free said latch arm means for movement out of its unpivoted position so that said shaft means is displaced relative to said stationary contact means to disengage said switch blade means therefrom, spring means for pivoting said switch blade means away from said stationary contact means after the disengagement thereof, and cam means on said shaft means for raising said latch arm means into engagement with said catch means upon pivotal movement of said switch blade means away from said stationary contact means so that said switch blade means will be held in engagement with said stationary contact means upon pivotal movement of said switch blade means toward its engaged position.

7. In a switching device the combination of a switch blade means, stationary contact means including switch blade holding means operable to engage said switch blade means to prevent pivotal movement thereof, first means supporting said switch blade means for pivotal movement toward engagement with said holding means, said first means being mounted for limited movement out of an initial position and away from said stationary contact means, second means for holding said first means in said initial position wherein said switch blade means is held in engagement with said stationary contact means by said holding means, electroresponsive counting means in circuit with said switch blade means and responsive to the appearance and disappearance of a predetermined number of abnormal circuit conditions to move said second means out of engagement with said first means to free said first means for movement out of said initial position so that said switch blade means is disengaged from said holding means, resilient means for pivoting said switch blade means away from said stationary contact means after the disengagement thereof from said holding means, and cam means on said switch blade means for moving said first means to its initial position upon pivotal movement of said switch blade means away from said stationary contact means so that said switch blade means will be engageable with said holding means upon pivotal movement thereof toward said stationary contact means.

8. In a switching device the combination of nominally vertical insulating means, stationary contact means mounted on said insulating means and including a first catch means, switch blade means having a first latch means on one end thereof, shaft means affixed to the other end of said switch blade means, latch arm means pivotally mounted on said insulating means in spaced relation below said stationary contact means for rotatably supporting said shaft means and being biased for movement out of an elevated position, second catch means for holding said latch arm means in an elevated position with said shaft means disposed toward said stationary contact means wherein said first latch means is engageable with said first catch means, electroresponsive counting means in circuit with said switch blade means and responsive to the appearance and disappearance of a predetermined number of abnormal circuit conditions to move said second catch means out of engagement with said latch arm means to free the latter for movement out of its elevated position so that said shaft means is moved downwardly and away from said stationary contact means to disengage said first latch means from said first catch means, spring means for pivoting said switch blade means away from said stationary contact means after the disengagement of said latch means and said first catch means, and cam means on said shaft means for raising said latch arm means into engagement with said second catch means upon pivotal movement of said switch blade means away from said stationary contact means so that said first latch means will engage said first catch means upon pivotal movement of said switch blade means toward said stationary contact means.

9. In a switching device, the combination of stationary contact means, switchblade means, latch means pivotally supporting said switchblade means below said stationary contact means for pivotal movement into and out of engagement therewith, said latch means being mounted for limited downward movement so that said switchblade means is disengaged from said stationary contact means, catch means for holding said latch means in an elevated position wherein said switchblade means is engageable with said stationary contact means, electroresponsive means in circuit with said switchblade means and responsive to a predetermined circuit condition to move said catch means out of engagement with said latch means to free said latch means for downward movement to disengage said switchblade means from said stationary contact means, resilient means for rotating said switchblade means away from said stationary contact means after the disengagement thereof, and cam means coupled to said switchblade means for moving said latch means upwardly into engagement with said catch means upon pivotal movement of said switchblade means away from said stationary contact means so that said switchblade means will be engageable with said stationary contact means upon return pivotal movement toward said stationary contact means.

10. In a switching device, the combination of stationary contact means, switchblade means, first means spaced from the stationary contact means and having an initial elevated position for supporting the switchblade means for pivotal movement into engagement with the stationary contact means and having a second position wherein the switchblade means is moved out of engagement with the stationary contact means, second means normally holding said first means in its elevated position, electroresponsive means in circuit with the switchblade means and responsive to a predetermined circuit condition to render said second means inoperative to support said first means so that said switchblade means is disengaged from said stationary contact means, third means for rotating said switchblade means away from said stationary contact means after the disengagement thereof, and fourth means associated with said switchblade means for returning said first means to its initial elevated position and into a held position relative to said second means as said switch blade means pivots away from said stationary contact means so that said switchblade means will be engageable with said stationary contact means upon return pivotal movement.

11. In a switching device, the combination of stationary contact means, switchblade means, latch means pivotally supporting said switchblade means below said stationary contact means for pivotal movement into and out of engagement therewith, said latch means being gravity biased for limited downward movement so that said switchblade means is disengaged from said stationary contact means, catch means for holding said latch means in an elevated position wherein said switchblade means is engageable with said stationary contact means, electroresponsive means in circuit with said switchblade means and responsive to a predetermined circuit condition to move said catch means out of engagement with said latch means to free said latch means for downward movement to disengage said switchblade means from said stationary contact means, resilient means for pivoting said switchblade means away from said stationary contact means after the disengagement thereof, and means mounted on said switch blade means for returning said latch means to its elevated latched position upon the pivoting of said switch blade means away from stationary contact means so that said switch blade means will be engageable with said stationary contact means upon return pivotal movement.

12. In a switching device, the combination of stationary contact means, switchblade means, shaft means affixed to said switchblade means, latch arm means pivotally mounted in spaced relation from said stationary contact means and rotatably supporting said shaft means, said stationary contact means including switchblade holding means operable to engage said switchblade means and to prevent pivotal movement thereof, said latch arm means being biased for pivotal movement away from said stationary contact means to disengage said switchblade from said stationary contact means, catch means for holding said latch arm means in an unpivoted position and said switchblade means in an engaged position relative to said stationary contact means, electroresponsive means in circuit with said switchblade means and responsive to a predetermined circuit condition to move said catch means out of engagement with said latch arm means to free said latch arm means for movement out of its unpivoted position so that said shaft means is displaced relative to said stationary contact means to disengage said switchblade means therefrom, resilient means for pivoting said switchblade means away from said stationary contact means after the disengagement thereof, and means coupled to said switch blade means for returning said latch arm means to its unpivoted position as said switch blade means pivots away from said stationary contact means so that said switch blade means will be engageable with said stationary contact means upon return pivotal movement.

References Cited by the Examiner
UNITED STATES PATENTS

| | | | |
|---|---|---|---|
| 1,289,656 | 12/1918 | Cheney | 200—108 |
| 1,734,190 | 11/1929 | Austin | 200—108 |
| 1,810,624 | 6/1931 | Rankin | 200—89 |
| 1,827,626 | 10/1931 | Thumin | 200—89 |
| 2,542,736 | 2/1951 | Viti et al. | 200—89 |
| 3,002,070 | 9/1961 | Bronikowski et al. | 200—114 |

KATHLEEN H. CLAFFY, *Primary Examiner.*

ROBERT K. SCHAEFER, BERNARD A. GILHEANY,
*Examiners.*

UNITED STATES PATENT OFFICE
CERTIFICATE OF CORRECTION

Patent No. 3,239,617                              March 8, 1966

Max Regert

It is hereby certified that error appears in the above numbered patent requiring correction and that the said Letters Patent should read as corrected below.

Column 5, line 59, for "witchblade" read -- switchblade --; line 68, for "more" read -- move --; line 74, after "first" insert -- means --; column 7, line 40, for "disenageg" read -- disengage --.

Signed and sealed this 23rd day of August 1966.

(SEAL)
Attest:

ERNEST W. SWIDER                              EDWARD J. BRENNER
Attesting Officer                                     Commissioner of Patents